(12) United States Patent
Momosaki (10) Patent No.: US 8,463,052 B2
(45) Date of Patent: Jun. 11, 2013

(54) ELECTRONIC APPARATUS AND IMAGE SEARCH METHOD

(75) Inventor: Kohei Momosaki, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 252 days.

(21) Appl. No.: 12/881,986

(22) Filed: Sep. 14, 2010

(65) Prior Publication Data

US 2011/0064311 A1    Mar. 17, 2011

(30) Foreign Application Priority Data

Sep. 15, 2009 (JP) ................................. 2009-213621

(51) Int. Cl.
*G06K 9/00* (2006.01)

(52) U.S. Cl.
USPC ........................................................ 382/224

(58) Field of Classification Search
None
See application file for complete search history.

(56) References Cited

U.S. PATENT DOCUMENTS

| | | | |
|---|---|---|---|
| 7,643,658 B2 * | 1/2010 | Kilner et al. | 382/118 |
| 2009/0087104 A1 | 4/2009 | Nakate | |
| 2009/0089712 A1 * | 4/2009 | Sato | 715/838 |
| 2009/0178126 A1 * | 7/2009 | Du et al. | 726/6 |

FOREIGN PATENT DOCUMENTS

| | | |
|---|---|---|
| JP | 2006-236218 A | 9/2006 |
| JP | 2006-277291 A | 10/2006 |
| JP | 2006-318034 A | 11/2006 |
| JP | 2007-041964 A | 2/2007 |
| JP | 2007-140897 A | 6/2007 |
| JP | 2008-077445 A | 4/2008 |
| JP | 2009-059042 A | 3/2009 |
| JP | 2009-099120 A | 5/2009 |
| WO | WO 2005/086479 A1 | 9/2005 |

OTHER PUBLICATIONS

Notice of Reasons for Rejection mailed by Japan Patent Office on Nov. 24, 2010 in the corresponding Japanese patent application No. 2009-213621.

Notice of Reasons for Rejection mailed by Japan Patent Office on Jul. 3, 2012 in the corresponding Japanese patent application No. 2009-213621.

* cited by examiner

*Primary Examiner* — Vikkram Bali
(74) *Attorney, Agent, or Firm* — Knobbe, Martens Olson & Bear LLP (57) ABSTRACT

According to one embodiment, an electronic apparatus includes a group creation module, a face image selection module, a display image selection module, and a display control module. The group creation module creates groups by classifying still images. The face image selection module displays face images of persons contained in the still images based on classification of the face images in order to select at least one face image, in such a manner that each of the face images corresponds to one classification. The display image selection module selects at least one still image to be displayed, from a group including still images containing face images belonging to the classification of the at least one face images selected by the face image selection module. The display control module controls display of the at least one still image selected by the display image selection module.

9 Claims, 7 Drawing Sheets

ELECTRONIC APPARATUS AND IMAGE SEARCH METHOD

CROSS-REFERENCE TO RELATED APPLICATIONS

This application is based upon and claims the benefit of priority from Japanese Patent Application No. 2009-213621, filed Sep. 15, 2009; the entire contents of which are incorporated herein by reference.

FIELD

Embodiments described herein relate generally to an image search technique applied to an electronic apparatus, for example, a personal computer.

BACKGROUND

In recent years, there have been a rapid increase in the number of pixels and a rapid size reduction for image pickup devices such as charge-coupled devices (CCDs) and complementary metal-oxide semiconductors (CMOSs) image sensors. Thus, high-resolution images can now be taken even using a cellular phone or a notebook personal computer. Moving and still images and the like taken with an image pickup device, that is, what is called digital images, can be stored in a card-type storage medium or hard disk drive (HDD) for compact management.

Furthermore, image reproduction apparatuses called digital photoframes or the like have started to prevail. The digital photoframe includes a slot in which a card-type storage medium is accommodated. The digital photoframe functions to sequentially display, at predetermined time intervals, a plurality of still images stored in the storage medium accommodated in the slot. The digital photoframe is utilized as a desktop accessory or the like. For example, personal computers and electronic cameras also commonly function to sequentially display a plurality of still images at predetermined intervals in the same manner as that in which the digital photoframe displays images.

Thus, various image search techniques have been proposed which can be applied to selection of still images to be displayed by a digital photoframe, from a large number of still images managed by, for example, an HDD (for example, Jpn. Pat. Appln. KOKAI Publication No. 2009-59042). According to an image handling apparatus in Jpn. Pat. Appln. KOKAI Publication No. 2009-59042, when a user specifies an image, the apparatus identifies a person in the image and searches for and presents images in which the person is shown together with another person. Thus, simply by selecting an image showing the target person, the user can extract images of a related person shown together with the target person.

Conventional image search techniques including Jpn. Pat. Appln. KOKAI Publication No. 2009-59042 described above are based on the operation of accepting input search key information on, for example, a person and detecting an image group that can be detected based directly on the search key information. Thus, for example, if a person is specified and such image search as described above is performed on, for example, images taken during travel with several persons or during a party of a large number of people, no scenery image is selected (scenery images are images showing no person) and no image of a related person is selected for whom there is no image in which the related person is shown together with the specified person.

Hence, there has been a demand for a highly intelligent image search method by which if a person is specified as search key information, not only images showing the person but also images with a predetermined connection with the person can be selected.

BRIEF DESCRIPTION OF THE DRAWINGS

A general architecture that implements the various feature of the invention will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus includes a group creation module, a face image selection module, a display image selection module, and a display control module. The group creation module creates groups by classifying still images. The face image selection module displays face images of persons contained in the still images based on classification of the face images in order to select at least one face image, in such a manner that each of the face images corresponds to one classification. The display image selection module selects at least one still image to be displayed, from a group including still images containing face images belonging to the classification of the at least one face images selected by the face image selection module. The display control module controls display of the at least one still image selected by the display image selection module.

Figure 1:
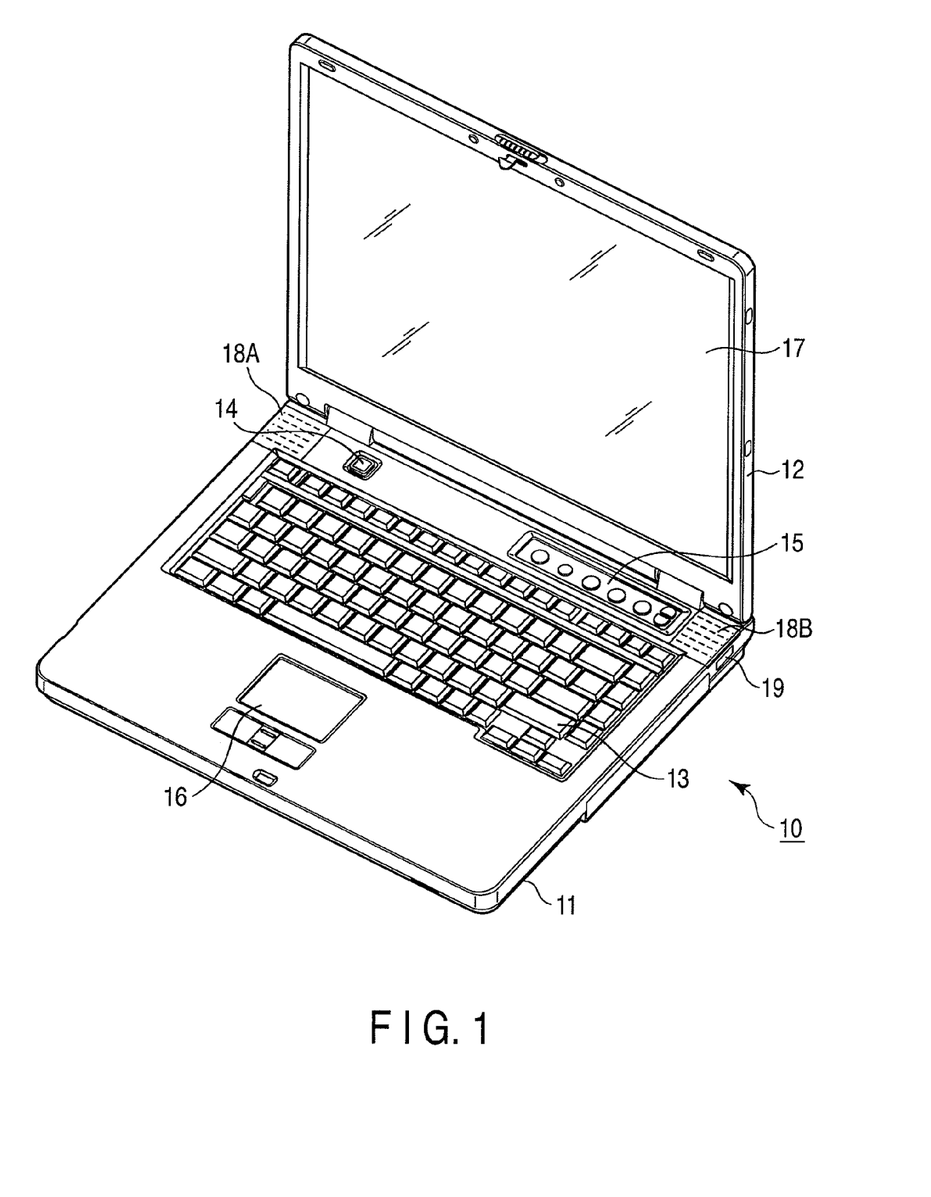
FIG. 1 is an exemplary diagram showing the appearance of an electronic apparatus according to an embodiment.

FIG. 1 is an exemplary diagram showing the appearance of an electronic apparatus according to the embodiment. The electronic apparatus is implemented as a notebook type personal computer 10, for example.

As shown in the computer 10 includes a computer main body 11 and a display unit 12. The display unit 12 incorporates a display apparatus including a liquid crystal display (LCD) 17. The display unit 12 is attached to the computer main body 11 so as to be pivotally movable between an open position where the top surface of the computer main body 11 is exposed and a closed position where the top surface of the computer main body 11 is covered.

The computer main body 11 has a thin box-like housing with a keyboard 13, a power button 14, an input operation panel 15, a touchpad 16, loudspeakers 18A and 18B, and the like arranged on the top surface of the housing: the power button 14 is used to power on and off the computer 10. Various operation buttons are provided on the input operation panel 15.

Furthermore, the computer main body 11 includes a universal serial bus (USB) connector 19 provided on the right side surface of the main body 11 and to which a USB cable or a USB device complying with, for example, the USB 2.0 standard is connected. Moreover, the computer main body 11 includes an external display connection terminal (not shown in the drawings) provided on the rear surface of the main body 11 and complying with, for example, the high-definition multimedia interface (HDMI) standard. The external display terminal is used to output digital video signals to an external display.

Figure 2:
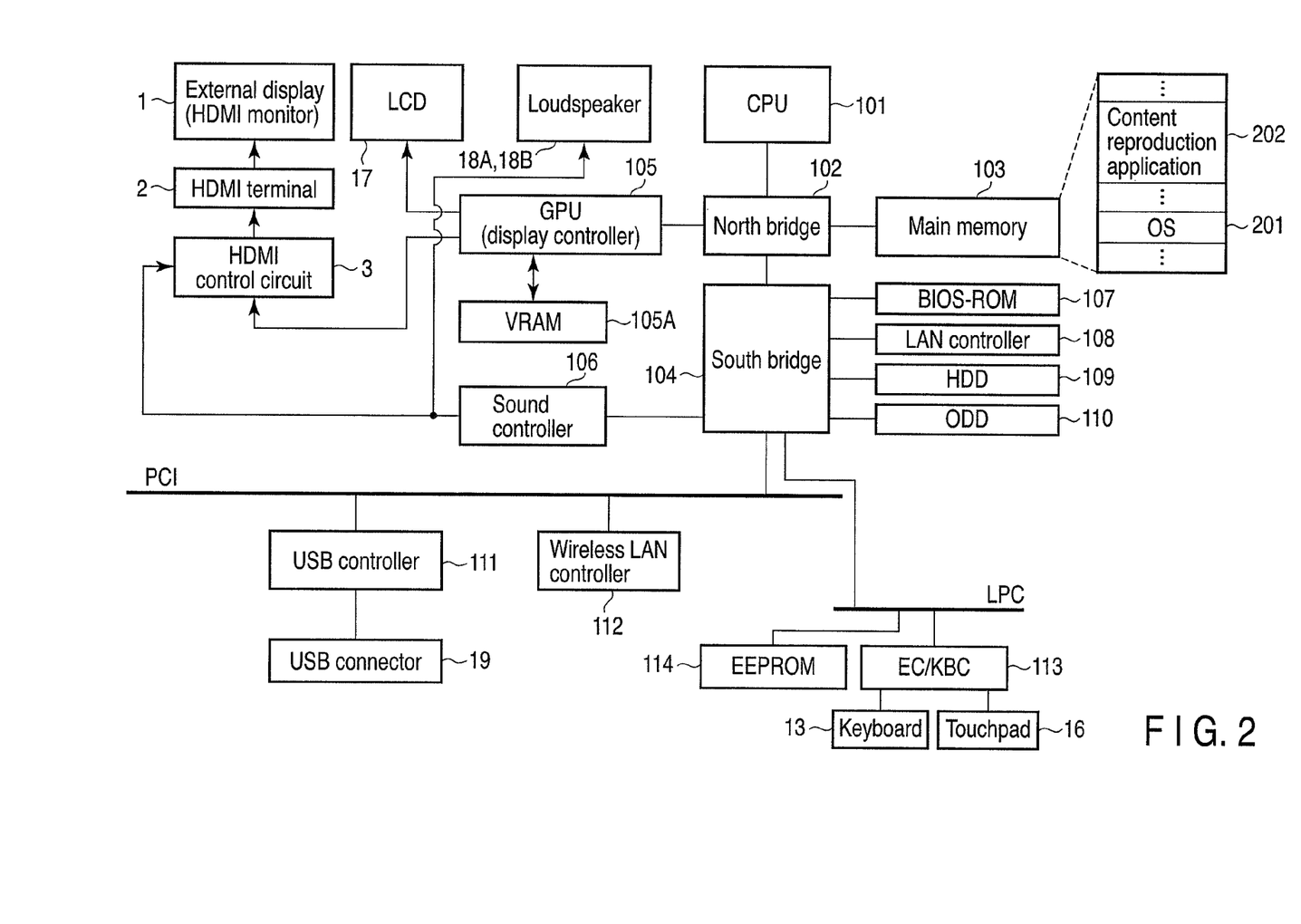
FIG. 2 is an exemplary diagram showing the system configuration of the electronic apparatus according to the embodiment.

FIG. 2 is an exemplary diagram showing the system configuration of the computer 10.

As shown in FIG. 2, the computer 10 includes central processing unit (CPU) 101, a north bridge 102, a main memory 103, a south bridge 104, graphics processing unit (GPU) 105, video-random access memory (VRAM) 105A, a sound controller 106, basic input/output system-read only memory (BIOS-ROM) 107, a local area network (LAN) controller 108, HDD 109, optical disc drive (ODD) 110, a USB controller 111, a wireless LAN controller 112, an embedded controller/keyboard controller (EC/KBC) 113, and electrically erasable programmable-ROM (EEPROM) 114.

The CPU 101 is a processor configured to control the operation of the computer 10 and to execute an operating system (OS) 201 and various application programs such as a content reproduction application program 202; the OS 201 and the application programs are loaded from the HDD 109 into the main memory 103. The content reproduction application program 202 is software providing a function to reproduce, for example, audio/video (AV) contents stored in digital versatile disc (DVD) loaded in the ODD 110. The content reproduction program 202 also functions to display digital images stored in the HDD 109, in the same manner as that in which what is called a digital photoframe displays images. Furthermore, the CPU 101 executes BIOS stored in BIOS-ROM 107. BIOS is a program for controlling hardware.

The north bridge 102 is a bridge device configured to connect a local bus for the CPU 101 to the south bridge 104. The north bridge 102 also contains a memory controller configured to control accesses to the main memory 103. The north bridge 102 also provides a function to communicate with GPU 105 via a serial bus complying with the PCI EXPRESS standard, for example.

The GPU 105 is a display controller configured to control LCD 17 used as a display monitor for the computer 10. Display signals generated by the GPU 105 are transmitted to LCD 17. Furthermore, the GPU 105 can transmit digital video signals to an external display apparatus 1 via an HDMI circuit 3 and an HDMI terminal 2.

The HDMI terminal 2 is the above-described external display connection terminal. The HDMI terminal 2 can transmit uncompressed digital video signals and digital audio signals to the external display apparatus 1 such as a television set, via one cable. The HDMI control circuit 3 is an interface configured to transmit digital video signals to the external display apparatus 1 called an HDMI monitor, via the HDMI terminal 2.

The south bridge 104 controls each of the devices on a peripheral component interconnect (PCI) bus and each of the devices on a low pin count (LPC) bus. The south bridge 104 also contains an integrated drive electronics (IDE) controller configured to control the HDD 109 and ODD 110. The south bridge 104 further provides a function to communicate with the sound controller 106.

The sound controller 106 is a sound source device configured to output audio data to be reproduced, to the loudspeakers 18A and 18B or the HDMI control circuit 3.

The LAN controller 108 is a wired communication device configured to perform wired communication complying with, for example, the IEEE 802.3 standard. On the other hand, the wireless LAN controller 112 performs wireless communication complying with the IEEE 802.11g standard. Furthermore, the USB controller 113 communicates with an external apparatus complying with, for example, the USB 2.0 standard (and connected to the USB controller 113 via the USB connector 19). For example, the USB controller 113 performs communication and the like required to load digital images managed by a digital camera, that is, the external apparatus, in the HDD 109.

The EC/KBC 113 is a single-chip microcomputer in which an embedded controller for power management and a keyboard controller configured to control the keyboard 13 and the touchpad 16 are integrated. The EC/KBC 114 functions to power on and off the computer 10 in response to the user's operation of the power button 14.

Now, a functional configuration of the content reproduction application program 202 operating on the computer 10 configured as described above will be described with reference to FIG. 3. Here, description will be given of one of the functions of the above-described content reproduction program 202, the function of displaying digital images (still image data 401) stored in the HDD 109 in the same manner as that in which what is called a digital photoframe displays images.

Figure 3:
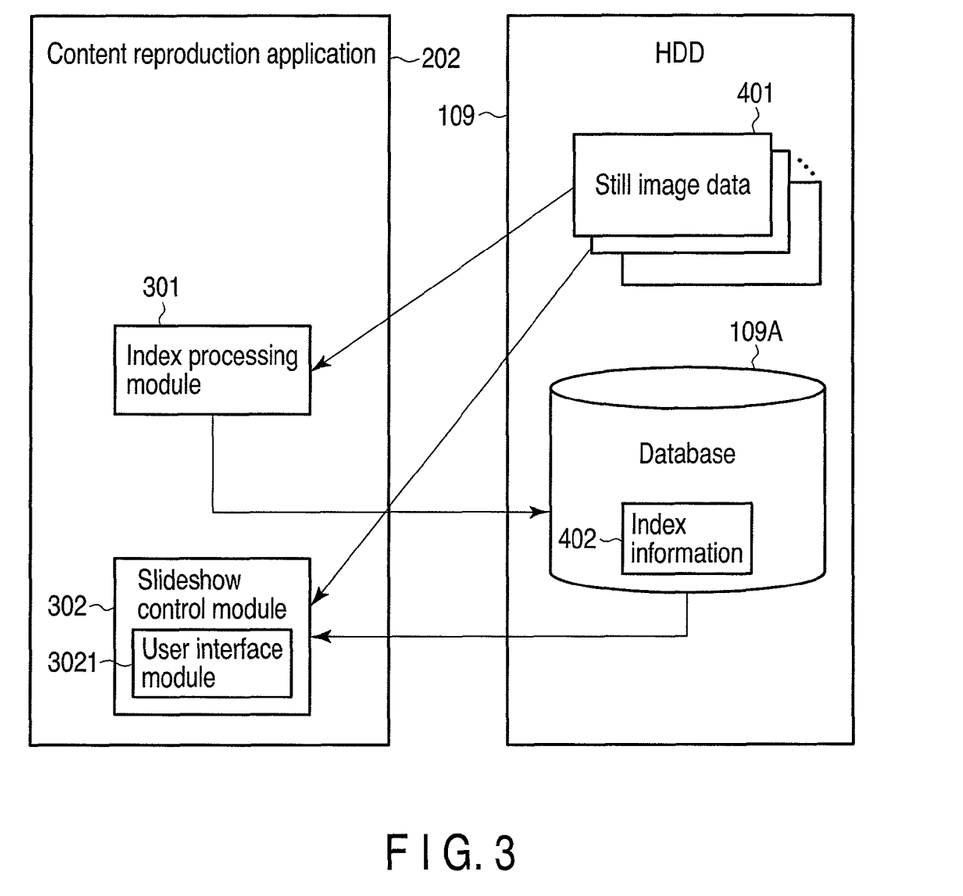
FIG. 3 is an exemplary block diagram showing the functional configuration of a content reproduction application program operating on the electronic apparatus according to the embodiment.

As shown in FIG. 3, the content reproduction application program 202 comprises an index processing module 301 and a slideshow control module 302.

The index processing module 301 executes various index processes for creating index information used to search the still image data 401 stored in the HDD 109 for a desired digital image. For example, the index processing module 301 extracts a face image from the still image data 401 showing a person. The face image is extracted by, for example, a face detection process of detecting the face image in the still image data 401 and a clipping process of clipping the detected face area from the still image data 401. The face area can be detected by, for example, analyzing the characteristics of the still image data 401 and searching for an area with characteristics similar to those of a prepared face image characteristic sample. The face image characteristic sample is characteristic data obtained by statistically processing the characteristics of face images of a large number of persons. The still image data 401 shown in FIG. 3 may be the images of the respective plurality of frames included in moving image data.

Figure 4:
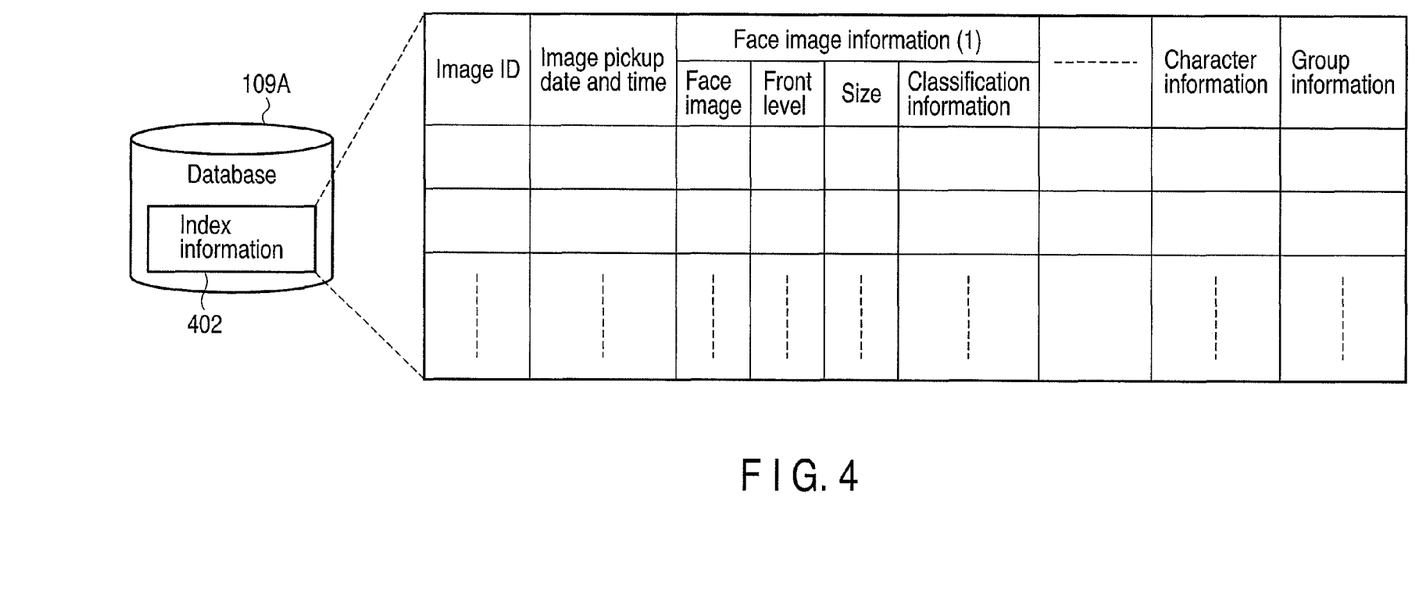
FIG. 4 is an exemplary diagram showing an example of configuration of index information used by the content reproduction application program operating on the electronic apparatus according to the embodiment.

The results of the index process executed by the index processing module 301 are stored in the database 109A as index information 402. The database 109A is a storage area prepared in the HDD 109 and configured to store the index information 402. FIG. 4 shows an example of the configuration of the index information 402 stored in the database 109A.

An "Image ID" is identification information uniquely assigned to each of the still images 401, and an "Image pickup date and time" is time information indicative of the image pickup date and time of each still image 401. If the still image data 401 are the images of the respective plurality of frames included in the moving image data, for example, time stamp information indicative of elapsed time from a leading frame is stored in the "Image ID" field+the "Image pickup date and time" field.

If the still image data 401 shows persons, "Face image information" is recorded for all of the persons shown in the still image data 401. As the "Face image information", first, the face images extracted from the still image data 401 by the index processing module 301 are stored. Furthermore, the index processing module 301 outputs the front level (indicative of the level at which the image of the face is taken from the front) and size (the size of the face image area in the original still image) of each face image extracted from the still image data 401. Moreover, the index processing module 301 divides the plurality of face images extracted from the still image data 401, into classes, that is, groups each of images estimated to show the same person. The index processing module 301 then outputs the results of the classification as classification information. The front level, the size, and the classification information are further stored as the "Face image information".

Furthermore, the index processing module 301 determines whether or not each of the still image data 401 contains any character, for example, a character on a sign, and outputs the result of the determination. The result of the determination is stored as "Character information". A character can be detected by searching for an area with characteristics similar to those of a characteristic sample of each character.

Moreover, based on, for example, the image pickup date and time, the index processing module 301 divides the plurality of still image data 401 stored in the HDD 109 into groups. The index processing module 301 then outputs information required to identify the groups. The information is stored as "Group information". For example, if two temporally consecutive still image data 401 last a period exceeding a predetermined value, the data are divided into two groups. Furthermore, if the still image data 401 are the images of the respective plurality of frames included in the moving image data, then for example, what is called a scene change portion is detected in which the characteristics of the image change significantly between two consecutive images. Then, each scene is determined to be an interval for grouping.

That is, the index information 402 enables determination of for example, whether or not each still image data 401 contains a face image, that is, whether or not the still image data 401 shows a person, who the person shown in the image is, whether or not the image data 401 contains any character, and which group the image data belongs. In another aspect, the index information 402 can be used to quickly search the plurality of still image data 401 stored in the HDD 109 for, for example, still image data 401 showing the target person, still image data 401 showing no person, or still image data showing the target person and a character.

The slideshow control module 302 uses the index information 402 created by the index processing module 301 to select the still image data 401 that meet a predetermined selection condition, from the plurality of still image data 401 stored in the HDD 109. The slideshow control module 302 thus carries out a display process of sequentially display images in the same manner as that in which what is called a digital photoframe displays images. The operational principle of the slideshow control module 302 will be described below in detail. In the present embodiment, the slideshow refers to sequential display of the plurality of still image data 401 at predetermined intervals. The slideshow may include not only the simple sequential display but also processed display such as a transition effect for display switching.

The slideshow control module 302 includes a user interface module 3021. The slideshow control module 302 uses the user interface module 3021 to display a person specification screen for slideshow display shown in FIG. 5, on LCD 17.

Figure 5:
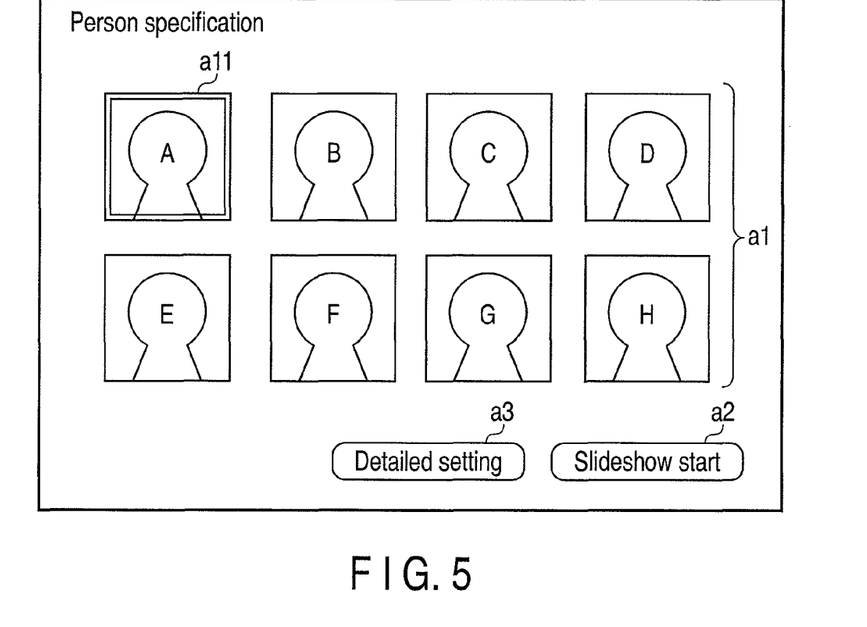
FIG. 5 is an exemplary diagram showing an example of a person specification screen for slideshow display shown by the content reproduction application program operating on the electronic apparatus according to the embodiment.

As shown in FIG. 5, a face list display area "a1" is provided on the person specification screen. The slideshow control module 302 uses the index information 402 stored in the database 109A to place face images of persons shown in at least one of the plurality of still image data 401 stored in the HDD 109, on the face list display area "a1" as choices. As shown in FIG. 4, the index information 402 includes the front level, the size, and the classification information. For each group of face images with the same classification information, the slideshow control module 302 selects one of the face images with a size equal to or larger than a threshold which has the highest front level, for example. The face images to be placed on the face list display area "a1" can be switched by operating the keyboard 13, the touchpad 16, or the like.

The face list display area "a1" allows the user to specify any person as search key information required to select still image data 401 to be displayed as a slideshow from the plurality of still image data 401 stored in the HDD 109. It is assumed that the user desires to display the still images 401 for a person A included in persons A to H with their face images arranged on the face list display area "a1". In this case, the user selects the face image "a11" of the person A located on the face list display area "a1".

Furthermore, a "slideshow start" button "a2" and a "Detailed setting" button "a3" are provided on the person specification screen. The "slideshow start" button "a2" is used to specify the start of a slideshow after one of the face images on the face list display area "a1" has been selected. The "Detailed setting" button "a3" is used to set an expansion condition for at least one of a selection rule for the still image 401 for the person in the face image selected on the face list display area "a1" and a display rule for the selected still image 401. Operating the "Detailed setting" button "a3" allows the slideshow control module 302 to display a detailed setting screen for slideshow display shown in FIG. 6, on LCD 17 using the user interface module 3021.

Figure 6:
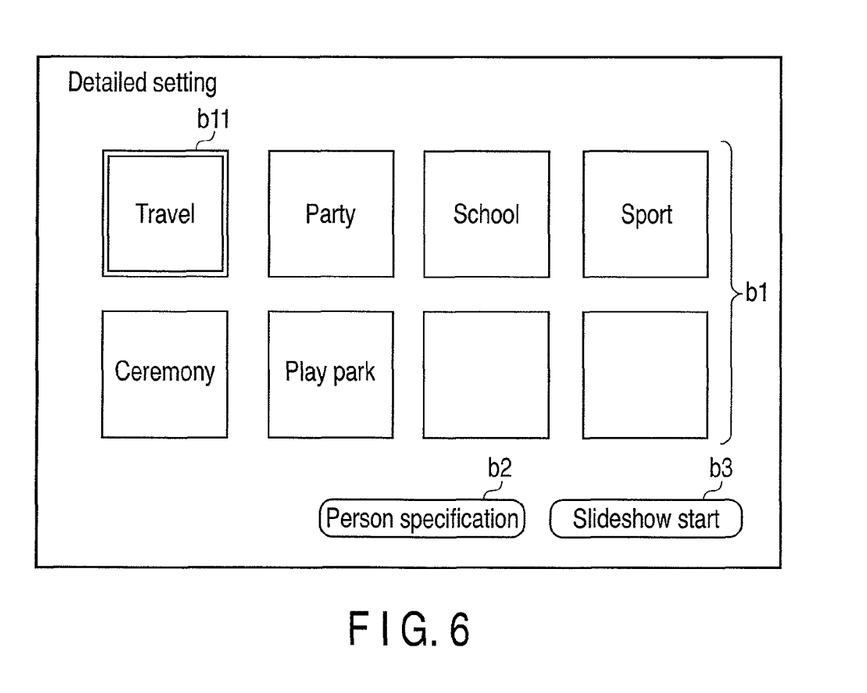
FIG. 6 is an exemplary diagram showing an example of a detailed setting screen for slideshow display shown by the content reproduction application program operating on the electronic apparatus according to the embodiment.

As shown in FIG. 6, a scene list display area "b1" is provided on the detailed setting screen. On the scene list display area "b1", an expansion condition for the selection or display rule suitable for each scene can be set; when "Travel" is selected, many scenery images (showing no person) are selected and are displayed before the other images (regardless of the image pickup order) so as to allow the place shown in the images to be immediately and clearly determined, and when "Party" is selected, images are selected so as to cover all the party participants, and images showing characters or the largest number of persons are displayed before the other images (regardless of the image pickup order) so as to allow the user to immediately and clearly determine what party it is. Here, it is assumed that the "Detailed setting" button "a3" is operated on the person specification screen shown in FIG. 5 and that "Travel" (icon "b11") is selected on the detailed setting screen.

The detailed setting screen with the scene list display area "b1" as described above includes a "Person specification" button "b2" used to return to the person specification screen shown in FIG. 5. Thus, the following procedure can also be carried out on the personal specification screen shown in FIG. 5. First, the "Detailed setting" button "a3" is operated to display the detailed setting screen. An expansion condition is set. Then, the "Person specification" button "b2" is operated to return to the person specification screen. A person is then selected.

Furthermore, as is the case with the person specification screen shown in FIG. 5, a "slideshow start" button "b3" is provided on the detailed setting screen. Thus, the start of a slideshow can be specified without the need to return to the person specification screen shown in FIG. 5.

Now, with reference to FIG. 7, description will be given of the basic principle of how upon receiving the operation on the personal specification screen shown in FIG. 5 and the operation on the detailed setting screen shown in FIG. 6, the slideshow control module 302 selects the still image data 401 to be displayed and display the selected still image data 401.

Figure 7:
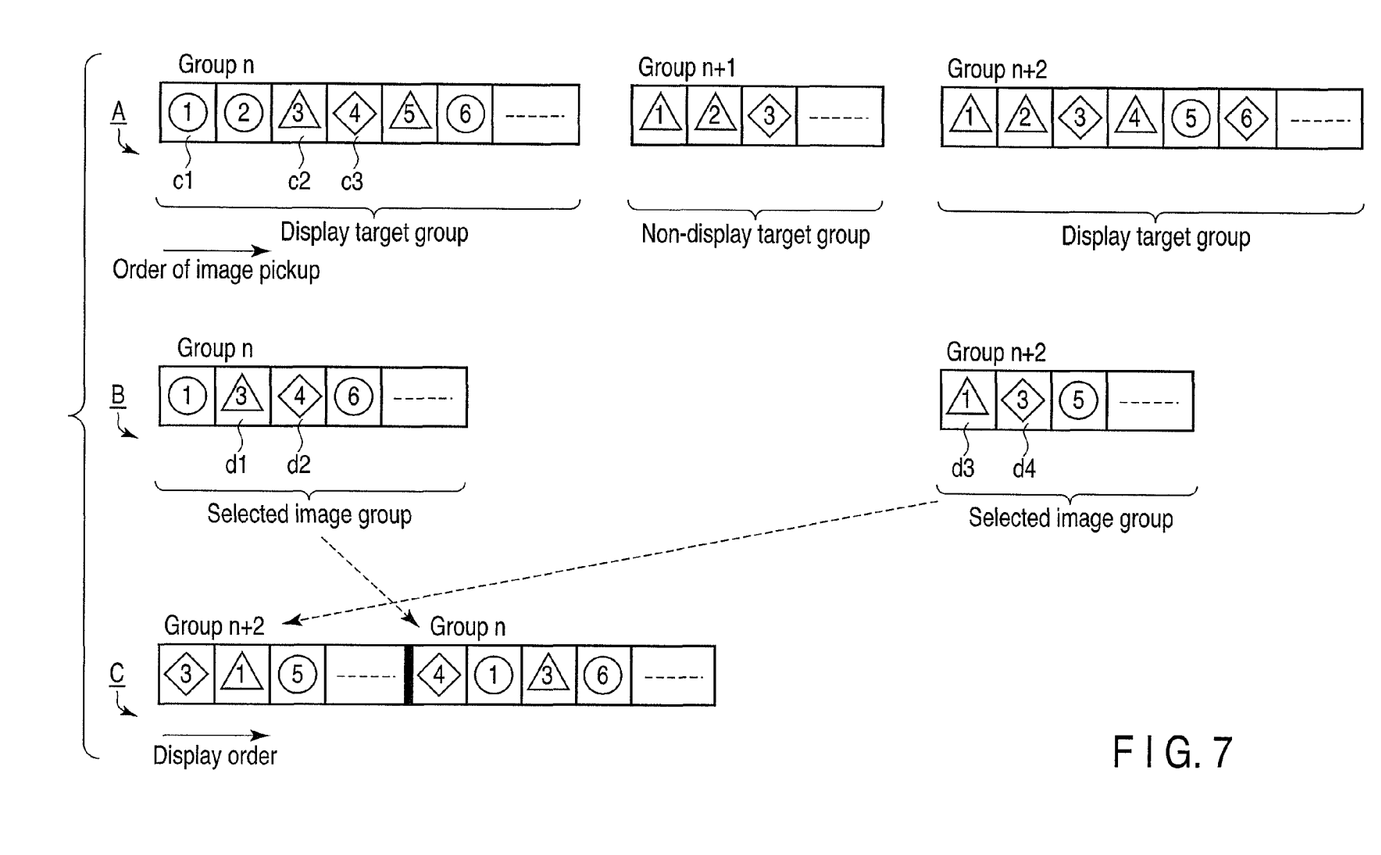
FIG. 7 is an exemplary conceptual drawing illustrating the basic principle of image selection and display performed by the content reproduction application program operating on the electronic apparatus according to the embodiment.

In FIG. 7, "A" is a first conceptual drawing showing that the plurality of still image data 401 stored in the HDD 109 are time-sequentially arranged and grouped in order of image pickup date and time based on the index information 402 stored in the database 109A. As shown in "A" in FIG. 7, it is assumed that the plurality of still image data 401 stored in the HDD 109 are divided into three groups, a group (n), a group (n+1), and a group (n+2). Each of the boxes with numbers 1, 2, 3, . . . in each group expresses one still image data 401. Each of the numbers denotes the order of the image pickup date and time in the group.

Furthermore, the circle in the box of the still image data 401 shown at reference number "c1" indicates that this still image data 401 is an image showing the person specified on the person specification screen shown in FIG. 5. The triangle in the box of the still image data 401 shown at reference number "c2" indicates that this still image data 401 is an image not showing the person specified on person specification screen shown in FIG. 5 but showing any other person. The rhombus in the box of the still image data shown at reference number "c3" indicates that this still image data 401 is an image showing no person.

That is, "A" in FIG. 7 indicates that two of the three groups (n), (n+1), and (n+2), that is, the groups (n) and (n+2), show the person specified on the person specification screen shown in FIG. 5. Thus, the slideshow control module 302 first carries out narrowing-down to determine the still image data 401 in the groups (n) and (n+2) to be display targets (selection of the display target group).

The slideshow control module 302 determines that the still image data 401 belonging to the same group as that which includes the still image data 401 showing the person specified on the person specification screen shown in FIG. 5 are images having a connection with the specified person (even if the images do not show the specified person). The slideshow control module 302 selects the still image data 401 from the selected display target group based on the index information 402 stored in the data base 109A, in accordance with an upper limit specified for the number of selected image data. At this time, highly intelligent image search that is different from the simple selection of an image showing the person is performed as follows. In principle, the image data 401 showing the person specified on the person specification screen shown in FIG. 5 is preferentially selected. If for example, "Travel" is selected on the detailed setting screen shown in FIG. 6, many scenery images (showing no person) are selected.

In FIG. 7, "B" is a second conceptual drawing showing the results of selection of the still image data 401 performed by the slideshow control module 302. As shown in "B" in FIG. 7, in the group (n), an image has been selected which is shown at reference number "d1" and which does not show the person specified on the person specification screen shown in FIG. 5 but show any other person. Furthermore, an image has also been selected which is shown at reference number "d2" and which shows no person. Similarly, in the group (n+2), an image has been selected which is shown at reference number "d3" and which does not show the person specified on the person specification screen shown in FIG. 5 but show any other person. Furthermore, an image has also been selected which is shown at reference number "d4" and which shows no person.

According to conventional image search techniques, the images shown at reference numbers "d1" to "d4" are not selected if the person is specified as search key information. In this regard, the content reproduction application program 202 carries out highly intelligent, effective image search such that a slideshow is displayed so as to clearly show "to where with whom".

Furthermore, in FIG. 7, "C" is a third conceptual drawing showing the order of display of the still image data 401 performed by the slideshow control module 302. As shown in "C" in FIG. 7, in order to meet a demand to view the latest image first, the slideshow control module 302 forms an arrangement in which the groups are placed from the current to the past (group (n+2), group (n)) and an arrangement in which the images in each group are placed so as to allow the user to enjoy viewing the images more naturally. That is, different algorithms are adopted for the arrangement of the groups and for the arrangement of the images in each group.

As described above, it is assumed herein that "Travel" is selected on the detailed setting screen shown in FIG. 6. Thus, in order to allow the user to determine, for example, "to where" first, the slideshow control module 302 places, for the group (n+2), the image shown at reference number "d4" and showing no person, that is, the image estimated to be a scenery image, at the leading position. The slideshow control module 302 subsequently arranges the other images in order of image pickup date and time. Similarly, for the group (n), the slideshow control module 302 places the image shown at reference number "d2" and estimated to be a scenery image, at the leading position, and subsequently arranges the other images in order of image pickup date and time.

That is, the content reproduction application program 202 also performs highly intelligent, effective image display such that an image suitable for understanding a scene such as "travel" is placed at the leading position as a typical image. If the setting of an expansion condition on the detailed setting screen shown in FIG. 6 is not carried out, the images in each group may be arranged in order of image pickup date and time.

Figure 8:
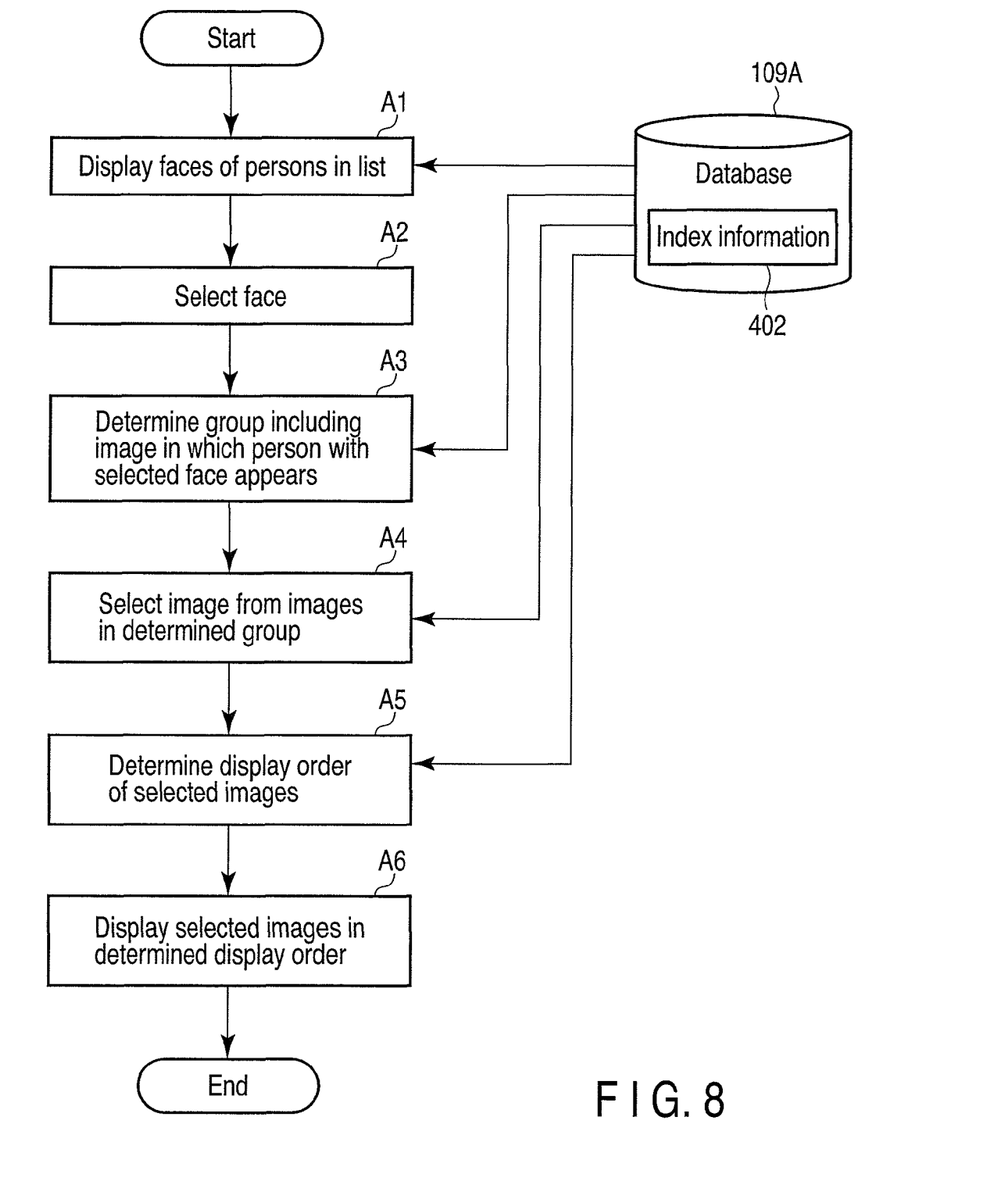
FIG. 8 is an exemplary flowchart showing the procedure of a slideshow display process executed by the content reproduction application program operating on the electronic apparatus according to the embodiment.

FIG. 8 is an exemplary flowchart showing the procedure of a slideshow display process executed by the content reproduction application program 202.

The content reproduction application program 202 first uses the index information 402 stored in the database 109A in the HDD 109 to display, in a list as choices, the face images of the persons shown in at least one of the plurality of still image data 401 stored in the HDD 109 (block A1).

When one of the face images displayed in the list is selected (block A2), the content reproduction application program 202 uses the index information 402 stored in the database 109A in the HDD 109 to determine the group including the still image data 401 in which the person with the selected face image is shown (block A3). The content reproduction application program 202 then selects the display target still image data 401 from the determined group (block A4).

Furthermore, the content reproduction application program 202 uses the index information 402 stored in the database 109A in the HDD 109 to further determine the order in which the selected still image data 401 are displayed (block A5). The content reproduction application program 202 then sequentially displays the selected still image data 401 on LCD 17 in accordance with the determined display order (block A6).

As described above, the computer 10 can realize highly intelligent image search and display such that selection is made not only of the image group that can be detected directly using the specified search key information but also of images with a predetermined connection with the search key information and that the images are arranged so as to allow the user to appreciate the image group more joyfully, instead of in the simple order of, for example, image pickup date and time.

In the above-described example, in order to allow display target still image data 401 to be selected from the still image data 401 stored in the HDD 109 using the index information 402 stored in the database 109A in the HDD 109, the face images of the persons shown in the still image data 401 are displayed in a list as choices. However, the usage of the index information 402 (used to select the display target still image data 401 from the still image data 401 stored in the HDD 109) is not limited to this aspect and may be varied in many ways.

For example, a table in which the classification information on the face images is associated with the names of the persons may be stored in the database 109A as the index information 402. Then, the names of the persons can be displayed in a list as choices. To manage the table, user interface module may be provided which displays face images in a list so that the name of the person in any of the face images can be input.

Furthermore, for example, the following method may be used instead of specifying a face image or name (which specifies a target person) as search key information. A date is specified as search key information, and monthly group information is used as the index information 402. Then, the selected and displayed image data may include not only the still image data 401 with an image pickup date and time matching the specified date but also the still image data 401 obtained in the same year and month or in a different year but the same month and considered to have a connection with one another.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a group creation module configured to create groups by classifying still images;
a face image selection module configured to display face images of persons contained in the still images, and to select at least one face image from the displayed face images;
a display image selection module configured to select at least one still image to be displayed, wherein the selection made by the display image selection module is intended for groups in which still images comprising the at least one face image selected by the face image selection module exist, and wherein the selection made by the display image selection module is intended for both the still images in which the at least one face image selected by the face image selection module is contained and still images in which the at least one face image selected by the face image selection module is not contained; and
a display control module configured to control display of the still images in which the at least one face image selected by the face image selection module is contained and the still images in which the at least one face image selected by the face image selection module is not contained, both the still images being selected by the display image selection module,
wherein the display image selection module is configured to select at least one still image with no face image selected by the face image selection module and with a face image different from the selected face image when the at least one still image exists in the groups in which the still images comprising the at least one face image selected by the face image selection module exist.

2. The apparatus of claim 1, wherein the still images comprise images of frames included in moving image data.

3. The apparatus of claim 1, wherein the display image selection module is configured to select at least one still image containing the face image selected by the face image selection module.

4. The apparatus of claim 1, wherein the display image selection module is configured to select at least one still image with no face images of persons, when the at least one still image exists in the groups in which the still images comprising the at least one face image selected by the face image selection module are contained.

5. The apparatus of claim 1, wherein the display image selection module is configured to preferentially select a still image comprising a face image having a high front level.

6. The apparatus of claim 1, wherein the display image selection module is configured to preferentially select a still image comprising a face image having a large size.

7. The apparatus of claim 1, further comprising a user interface module configured to specify a rule applied to the display image selection module for selecting the at least one still image from the groups in which the still images comprising the at least one face image selected by the face image selection module.

8. An image display method of an electronic apparatus comprising a storage medium configured to store still images, the method comprising:
creating groups by classifying the still images;
displaying face images of persons contained in the still images, and selecting at least one face image from the displayed face images;
selecting at least one still image to be displayed, wherein the selecting is intended for groups in which still images comprising the selected at least one face image exist, and wherein the selecting is intended for both the still images in which the selected at least one face image is contained and still images in which the selected at least one face image is not contained; and controlling display of the selected still images in which the selected at least one face image is contained and the selected still images in which the selected at least one face image is not contained, wherein the selecting at least one still image to be displayed comprises selecting at least one still image with no selected face image and with a face image different from the selected face image, when the at least one still image exists in the groups in which the still images comprising the selected at least one face image exist.

9. A non-transitory computer-readable medium having stored thereon a computer program which is executable by a computer comprising a storage medium configured to store still images, the computer program controls the computer to execute function as:

a group creation module configured to create groups by classifying the still images;

a face image selection module configured to display face images of persons contained in the still images, and to select at least one face image from the displayed face images;

a display image selection module configured to select at least one still image to be displayed, wherein the selection made by the display image selection module is intended for groups in which still images comprising the at least one face image selected by the face image selection module exist, and wherein the selection made by the display image selection module is intended for both the still images in which the at least one face image selected by the face image selection module is contained and still images in which the at least one face image selected by the face image selection module is not contained; and a display control module configured to control display of the still images in which the at least one face image selected by the face image selection module is contained and the still images in which the at least one face image selected by the face image selection module is not contained, both the still images being selected by the display image selection module, wherein the display image selection module is configured to select at least one still image with no face image selected by the face image selection module and with a face image different from the selected face image, when the at least one still image exists in the groups in which the still images comprising the at least one face image selected by the face image selection module exist.

* * * * *